US005244729A

United States Patent [19]

Harrison et al.

[11] Patent Number: 5,244,729

[45] Date of Patent: Sep. 14, 1993

[54] POLYMERIC FILM COMPRISING A COATING LAYER OF VERMICULITE PLATELETS

[75] Inventors: Anthony G. Harrison; William N. E. Meredith, both of Cleveland; David E. Higgins, North Yorkshire, all of England

[73] Assignee: Imperial Chemical Industries PLC, London, United Kingdom

[21] Appl. No.: 828,457

[22] Filed: Jan. 31, 1992

[30] Foreign Application Priority Data

Feb. 4, 1991 [GB] United Kingdom ................. 9102374

[51] Int. Cl.$^5$ ................................................ B32B 5/16

[52] U.S. Cl. .................................... 428/331; 428/333; 428/402; 428/480; 428/500; 428/689; 428/701; 428/702; 428/910

[58] Field of Search ............... 428/331, 402, 913, 333, 428/480, 910, 500, 689, 701, 702

[56] References Cited

U.S. PATENT DOCUMENTS

| | | | |
|---|---|---|---|
| 3,499,820 | 3/1970 | Desaulniers | 428/331 X |
| 3,539,437 | 11/1970 | Kirk et al. | 428/328 X |
| 4,447,491 | 5/1984 | Bradbury et al. | 428/304.4 |
| 4,608,303 | 8/1986 | Ballard et al. | 428/357 |
| 4,877,551 | 10/1989 | Lukacs, III | 428/363 X |

*Primary Examiner*—Paul J. Thibodeau
*Assistant Examiner*—H. Thi Le
*Attorney, Agent, or Firm*—Cushman, Darby & Cushman

[57] ABSTRACT

A polymeric film comprising a substrate layer of polymeric material having on at least one surface thereof a coating layer comprising vermiculite platelets wherein 50 to 100% by number of the platelets have a particle size in the range 0.5 to 5.0 μm. The film exhibits oxygen barrier properties and is suitable for use as a packaging film.

9 Claims, 1 Drawing Sheet

POLYMERIC FILM COMPRISING A COATING LAYER OF VERMICULITE PLATELETS

This invention relates to a polymeric film, and in particular to a polymeric film exhibiting oxygen barrier properties.

There is a commercial need for polymeric films, particularly packaging films, to provide a barrier to gases, especially oxygen. Polymeric films generally have poor oxygen barrier properties. Traditionally oxygen barrier properties have been imparted to polymeric films by coating with suitable polymers, for example polyvinylidene chloride. There is a need, however for alternative materials to polyvinylidene chloride and the like.

U.S. Pat. No. 3,499,820 discloses the use of alternative materials i.e. platelets, for providing gas barrier properties when coated onto or sandwiched between polymeric films. U.S. Pat. No. 3,499,820 teaches that virtually any substance, for example graphite, metals, organic materials such as N-benzoyl acetamide, and inorganic materials such as minerals, existing in the form of platelets can be coated onto a polymeric film to provide gas, especially oxygen, barrier properties. The aforementioned minerals can be naturally occurring, a synthetic mineral or a chemically modified mineral. The only mineral included in the specific examples is bentonite clay. The platelets should have a length of 0.005 to 30 μm and an axial ratio of 20 to 300:1.

Japanese Unexamined Patent Application No. 63-233836 discloses a polymeric film with gas barrier properties which comprises a coating of a mixture of a sheet silicate possessing swelling properties and polyvinylidene chloride in the ratio of 2 to 1/100 respectively. The sheet silicate can be a natural substance or preferably a synthetic compound because of its excellent planarity and large crystal size. Lithium teniolite, having a mean particle size of 0.6 μm, is the only specific example of a sheet silicate included in the specification.

We have now devised a polymeric film comprising a layer of vermiculite of a defined particle size range which surprisingly exhibits oxygen barrier properties, without resorting to the use of polyvinylidene chloride polymers.

Accordingly, the present invention provides a polymeric film comprising a substrate layer of polymeric material having on at least one surface thereof a coating layer comprising vermiculite platelets wherein 50 to 100% by number of the platelets have a particle size in the range 0.5 to 5.0 μm.

The invention also provides a method of producing a polymeric film by forming a substrate layer of polymeric material, and applying to at least one surface thereof a coating layer comprising vermiculite platelets wherein 50 to 100% by number of the platelets have a particle size in the range 0.5 to 5.0 μm.

A substrate for use in the production of a coated film according to the invention suitably comprises any polymeric material capable of forming a self-supporting opaque, or preferably transparent, film or sheet.

By a "self-supporting film or sheet" is meant a film or sheet capable of independent existence in the absence of a supporting base.

The substrate of a coated film according to the invention may be formed from any synthetic, film-forming, polymeric material. Suitable thermoplastics, synthetic, materials include a homopolymer or a copolymer of a 1-olefine, such as ethylene, propylene or butene-1, especially polypropylene, a polyamide, a polycarbonate, and particularly a synthetic linear polyester which may be obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, e.g. ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent 838,708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. The substrate may comprise a poly(arylene sulphide), particularly poly-p-phenylene sulphide or copolymers thereof. Blends of the aforementioned polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polymeric film substrate for production of a coated film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, i.e. the forward direction through the film stretching machine, and then in the transverse direction. A stretched substrate film may be, and preferably is, dimensionally stabilised by heat-setting under dimensional restraint at a temperature above the glass transition temperature thereof.

The substrate is suitably of a thickness from 6 to 300, particularly from 6 to 100, and especially from 6 to 25 μm.

Vermiculite is a 2:1 phyllosilicate layer mineral. For information on the composition and structure of vermiculite layer minerals, reference can be made to "Clay Minerals: Their Structure, Behaviour & Use", Proceedings of a Royal Society Discussion Meeting, Nov. 9 & 10, 1983, London, The Royal Society, 1984 (particularly pages 232–234).

The term "vermiculite" as used in this specification means all materials known mineralogically and commercially as vermiculite including minerals having a proportion of vermiculite layers, for example hydrobiotites and chlorites.

The term "vermiculite platelets" as used in this specification means tiny particles or flakes of the layer mineral vermiculite obtained by treating vermiculite with chemicals, swelling the treated vermiculite in water and applying shear to the swollen vermiculite particles in water to delaminate the layer mineral and produce an aqueous suspension of tiny particles of the layer mineral. The tiny particles or platelets are mutually adhesive and film forming.

Vermiculite ore being a naturally-occurring mineral contains a mixture of phases (e.g. vermiculite, biotite, hydrobiotite etc) and a mixture of interlayer cations (e.g. $Mg^{2+}$, $Ca^{2+}$, $K^{+}$). Production of aqueous suspensions or slurries of vermiculite platelets rely on ion exchange (normally incomplete) to introduce enough of a swelling cation (e.g. n-butylammonium, $Li^{+}$) to generate adequate macroscopic swelling. The amount of swelling produced is generally dependent upon the extent of ion exchange. The swollen, partially-exchanged vermiculite gel can then be milled to produce an aqueous film-forming suspension of vermiculite platelets. Treatment of vermiculite particles with one or more aqueous solutions of metal (especially alkali metal) salts or alkyl ammonium salts followed by swelling in water and then milling to delaminate the vermiculite is well known and is described for example in UK-A-1016385, UK-A-1119305, UK-A-1585104 and UK-A-1593382, and in US-A-4130687.

The physical properties of the resulting vermiculite platelets depend, inter alia, on the geographical origin of the ore, the specific type and amount of swelling cation used, the precise process conditions employed during the ion-exchange and milling steps, and upon any subsequent fractionation processes, e.g. centrifugation or sieving in order to obtain platelets of a particular size range. The present invention is not limited to a particular process of producing vermiculite platelets of the critical particle size range as herein described. There may be alternative processes for producing vermiculite platelets as herein described which would be evident to the man skilled in the art.

By particle size of a vermiculite platelet is meant the size of the maximum width of the platelet.

A polymeric film according to the invention preferably comprises a coating layer of vermiculite platelets wherein 55 to 99.9%, more preferably 60 to 99%, and particularly 70 to 95% by number of the platelets have a particle size in the range 0.5 to 5.0 μm. It is also preferred that 80 to 100%, more preferably 80 to 99.9%, especially 85 to 99.9%, and particularly 90 to 99.9% by number of the vermiculite platelets have a particle size in the range 0.1 to 5.0 μm. The mean particle size of vermiculite platelets is preferably 1.0 to 3.0 μm, more preferably 1.2 to 2.2 μm, and especially 1.3 to 1.6 μm.

By mean particle size of a vermiculite platelet is meant the mean value of the maximum width of the platelets.

The vermiculite platelets for use in films according to the invention preferably comprise from 0 to 20%, more preferably from 0 to 15%, and particularly from 0 to 5% by number of the platelets having a particle size less than 0.1 μm. In addition the vermiculite platelets for use in the invention preferably comprise from 0 to 20%, more preferably from 0 to 15%, and particularly from 0 to 10% by number of the platelets having a particle size greater than 5.0 μm.

The ratio, of preferably at least 70%, more preferably at least 80%, and particularly at least 90% by number, of the maximum width to the minimum width of vermiculite platelets is preferably less than 4:1, more preferably less than 2:1, and particularly less than 1.5:1.

In a preferred embodiment of the invention the vermiculite platelets suitably have a thickness in the range from approximately 10 to 60 A, especially from approximately 25 to 40 A. It is preferred that from 60 to 100%, more preferably from 70 to 99%, and particularly from 90 to 95% by number of vermiculite platelets have a thickness in the range 10 to 60 A. The mean thickness of vermiculite platelets is preferably 25 to 50 A, more preferably 25 to 40 A, and especially 25 to 30 A.

The aspect ratio, by which is meant the ratio of the maximum width to the thickness, of vermiculite platelets is suitably greater than 200. It is preferred that from 60 to 100%, more preferably from 70 to 99%, and particularly from 90 to 99% by number of vermiculite platelets have an aspect ratio in the range from 200 to 3000, more preferably from 300 to 2000, and especially from 500 to 1500. The mean aspect ratio of vermiculite platelets is preferably 600 to 1400, more preferably 700 to 1200, and especially 800 to 1000.

It is preferred that the platelets are of uniform thickness, preferably the mean ratio of the maximum thickness to the minimum thickness of the platelets is less than 1.2:1, more preferably less than 1.1:1, and particularly less than 1.05:1.

Although the coating layer can comprise a substantially continuous layer of vermiculite platelets of any practical thickness, polymeric films having a surprisingly improved barrier property against atmospheric oxygen comprise a substantially continuous layer of platelets at very low thicknesses, e.g. as low as 0.025 μm, but preferably the minimum thickness of the layer is at least 0.05 μm. The maximum thickness of the vermiculite layer is preferably 5 μm, and particularly up to 2.0 μm.

The ratio of substrate to coating layer thickness may vary within a wide range, although the thickness of the coating layer preferably should not be less than 0.1% nor greater than 25% of that of the substrate.

The coating layer is preferably applied to the polymeric substrate at a coat weight within the range 0.1 to 10 $mgdm^{-2}$, especially 0.5 to 10.0 $mgdm^{-2}$. For films coated on both surfaces, each layer preferably has a coat weight within the preferred range.

The vermiculite platelets preferably comprise at least 5% by weight of the layer and, more particularly, between 10% and 95%, and especially between 30% and 90%, by weight of the coating layer.

In a preferred embodiment of the invention the coating layer additionally comprises at least one material which may be any polymer known in the art to be capable of forming a continuous, preferably uniform coating. The polymeric material is preferably an organic resin and may be any film-forming polymeric or oligomeric species or precursor therefor that assists in forming a film of the vermiculite platelets and does not disrupt the film-forming capability thereof.

Suitable polymeric resins include:

(a) homopolyesters, such as polyethylene terephthlate;
(b) copolyesters, particularly those derived from a sulpho derivative of a dicarboxylic acid such as sulphoterephthalic acid and/or sulphoisophthalic acid;
(c) copolymers of styrene with one or more ethylenically unsaturated comonomers such as maleic anhydride or itaconic acid, especially the copolymers described in GB-A-1540067;
(d) copolymers of acrylic acid and/or methacrylic acid and/or their lower alkyl (up to 6 carbon atoms) esters, e.g. copolymers of ethyl acrylate and methyl methacrylate, copolymers of methyl methacrylate/butyl acrylate/acrylic acid typically in the molar proportions 55/27/18% and 36/24/40%;
(e) functionalised polyolefins, especially maleinised polybutadiene;
(f) cellulosic materials such as nitrocellulose, ethylcellulose and hydroxyethylcellulose; and
(g) polyvinyl alcohol.

A preferred polymeric resin comprises an acrylic or methacrylic resin, preferably comprising a polymer comprising at least one monomer derived from an ester of acrylic acid and/or an ester of methacrylic acid, especially an alkyl ester of (meth)acrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. The acrylic resin preferably comprises greater than 50 mole %, and preferably less than 98 mole %, especially from 70 to 96 mole %, and particularly from 80 to 94 mole % of at least one monomer derived from an ester of acrylic acid and/or an ester of methacrylic acid, and/or derivatives thereof. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range 30 to 65 mole %, and the methacrylate monomer is preferably present in a proportion in the range of 20 to 60 mole %.

A preferred acrylic resin, derived from 3 monomers comprises 35 to 60 mole % of ethyl acrylate/30 to 55 mole % of methyl methacrylate/2-20 mole % of methacrylamide, and especially comprising approximate molar proportions 46/46/8% respectively of ethyl acrylate/methyl methacrylate/acrylamide or methacrylamide.

The molecular weight of polymeric resin of the coating layer can vary over a wide range but the weight average molecular weight is preferably less than 2,000,000, more preferably within the range 40,000 to 1,000,000, and particularly within the range 50,000 to 500,000.

The polymeric resin preferably comprises up to 95% by weight of the layer and, more particularly, between 5% and 90%, and especially between 10% and 70%, by weight of the coating layer. The polymeric resin(s) of the coating layer composition is generally water-insoluble. The coating composition including the water-insoluble polymer(s) may nevertheless be applied to the polymeric film substrate as an aqueous dispersion.

The coating layer is formed by applying the vermiculite platelets as a slurry or dispersion and removing the dispersion medium to form a coherent layer. Preferably, the dispersion medium comprises water and the slurry or dispersion comprises between 0.5% and 20%, more especially between 1% and 10%, by weight of vermiculite platelets.

The coating layer composition may be applied before, during or after the stretching operation performed in the production of an oriented film. The coating composition may, for example, be applied to the film substrate between the two stages (longitudinal and transverse) of a biaxial stretching operation. Such a sequence of stretching and coating can be suitable for the production of a coated linear polyester film substrate, which is preferably firstly stretched in the longitudinal direction over a series of rotating rollers, coated, and then stretched transversely in a stenter oven, preferably followed by heat setting. The coating composition is preferably applied to an already oriented film substrate, such as a biaxially oriented polyester, particularly polyethylene terephthalate film.

The coating composition may be applied to the polymeric film substrate as an aqueous dispersion or solution in an organic solvent by any suitable conventional coating technique such as dip coating, bead coating, reverse roller coating or slot coating.

The temperature to which the coated film is heated depends, inter alia on the composition of the polymeric substrate. A coated polyester, especially polyethylene terephthalate, substrate is suitably heated from 150° C. to 240° C., preferably from 200° C. to 220° C., in order to dry the aqueous medium, or the solvent in the case of solvent-applied compositions, and also to assist in coalescing and forming the coating into a continuous and uniform layer. In contrast, a coated polyolefin, especially polypropylene, is suitably heated in the range 85° C. to 95° C.

Prior to deposition of the coated layer onto the polymeric substrate, the exposed surface thereof may, if desired, be subjected to a chemical or physical surface-modifying treatment to improve the bond between that surface and the subsequently applied coating layer. A preferred treatment, because of its simplicity and effectiveness, which is particularly suitable for the treatment of a polyolefin substrate, is to subject the exposed surface of the substrate to a high voltage electrical stress accompanied by corona discharge. Corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4 6-trichlorophenol or 4-chlororesorcinol in acetone or methanol.

An additional primer layer may be applied to the substrate layer prior to coating with the layer mineral layer. The primer layer may comprise any suitable film-forming polymeric resin but preferably comprises an acrylic resin, particularly an acrylic resin as desribed herein for use in combination with a layer mineral in the coating layer. The same acrylic resin may be used in both the coating layer and the primer layer.

An additional overcoat layer may be applied to the coating layer. The overcoat layer may comprise any suitable film-forming polymeric resin but preferably comprises an acrylic resin, particularly an acrylic resin as desribed herein for use in combination with a layer mineral in the coating layer. The same acrylic resin may be used in both the coating layer and the overcoat layer.

In a further embodiment of the invention the polymeric film comprises, in order, a substrate layer, an acrylic primer layer, a coating layer comprising a layer mineral and an acrylic resin as hereinbefore described, and an acrylic overcoat layer. The same acrylic resin may be present in the top three layers.

One or more of the layers of a coated film according to the invention, i.e. substrate, primer, coating or overcoat layer(s), may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate and/or coating layer(s), as appropriate. In particular, a substrate may comprise a particulate filler, such as silica, of small particle size. Desirably, a filler, if employed in a substrate layer, should be present in a small amount, not exceeding 0.5%, preferably less than 0.2%, by weight of the substrate.

The invention is illustrated by reference to the accompanying drawings in which.

Figure 1:
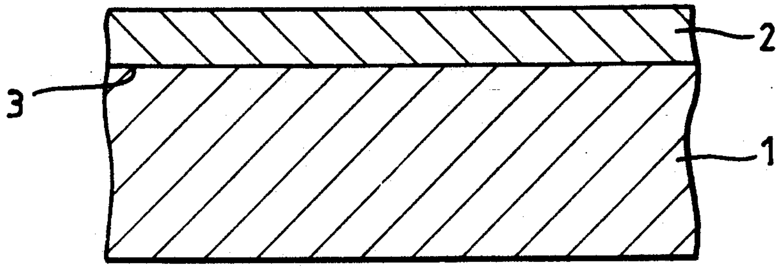
FIG. 1 is a schematic sectional elevation, not to scale, of a coated film having a substrate and coating layer.

Referring to FIG. 1 of the drawings, the film comprises a polymeric substrate layer (1) having a coating layer (2) bonded to one surface (3) thereof.

Figure 2:
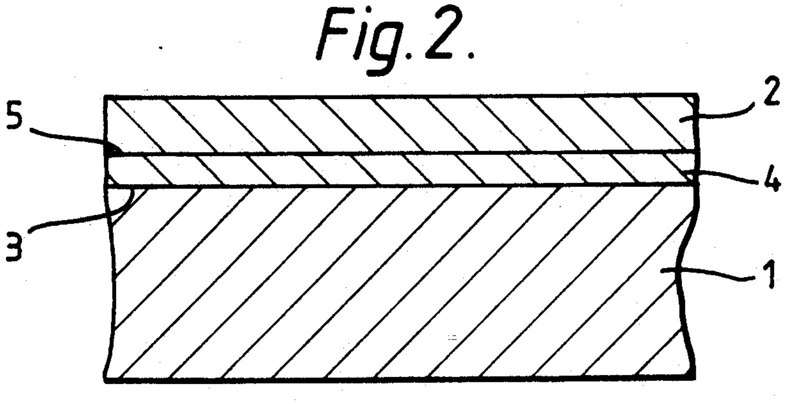
FIG. 2 is a similar schematic elevation of a coated film with an additional primer layer in between the substrate and coating layer.

The film of FIG. 2 further comprises an additional primer layer (4), bonded to the surface (3) of the substrate (1) and the surface (5) of the coating layer (2).

Figure 3:
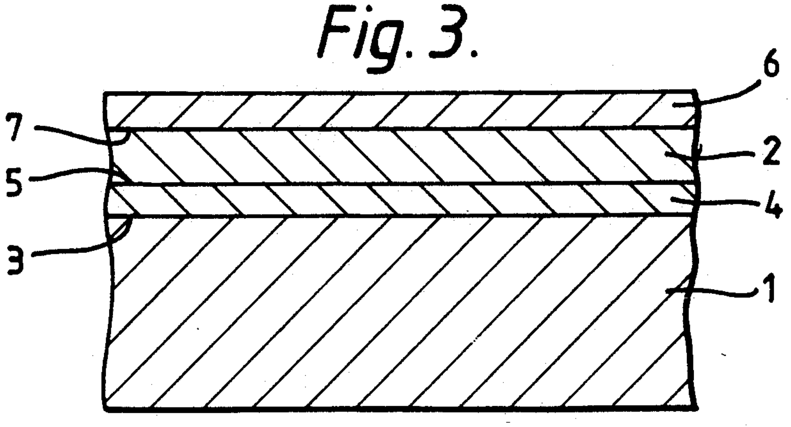
FIG. 3 is a similar schematic elevation of a film as shown in FIG. 2, with an additional overcoat layer on the remote surface of the coating layer.

The film of FIG. 3 further comprises an additional overcoat layer (6), bonded to the remote surface (7) of the coating layer (2).

The invention is further illustrated by reference to the following examples.

The following test procedures were used.

Platelet Dimensions

The thickness of the vermiculite platelets was determined by using a platinum/carbon shadowing technique. The procedure was as follows:—one drop of an approximately 5 to 20% by weight aqueous slurry of vermiculite was diluted approximately 1000 times in distilled water, optionally containing a dispersing agent, for example sodium tripolyphosphate, and ultrasonically dispersed for 2 minutes. Approximately 1 to 1.5 ml of the dispersion was deposited on a freshly cleaved mica surface and allowed to dry. The sample was sputtered at an angle of 10° with platinum/carbon. The platinum/carbon film was floated off onto a water surface and deposited onto a transmission electron microscope (TEM) grid before drying and viewing.

The maximum and minimum widths of the vermiculite platelets were determined by depositing a similar ultrasonically dispersed vermiculite sample directly onto a TEM grid, drying and viewing.

The aspect ratio of the vermiculite platelets was calculated from the thickness and the maximum width measurements.

Oxygen Barrier

The oxygen barrier property of a film was determined by measuring the oxygen permeability of the film using a Mocon 1050 (Modern Controls Inc.) test instrument. A film sample was placed in the machine with the nitrogen carrier gas flowing both above and below the film, in order that a background reading can be obtained. The nitrogen above the film was replaced by oxygen, and the amount of oxygen able to permeate through the film was measured in a carrier gas by using a sensor.

EXAMPLE 1

A 600 g sample of good quality vermiculite ore (Medium Grade (14 A, low potassium), Eucatex mine, Brasil—supplied by Eucatex SA, Ave. Francisco, Matarazzo 584, Sao Paulo, Brasil) was placed in an ion exchange column (0.5 m high) and 1N sodium chloride solution was pumped through at a rate of 0.03 ml/g/hr. The total concentration of potassium, magnesium and calcium in the effluent was monitored and when the concentration fell below 10 mN, the input solution was changed to 1N butylammonium chloride and the temperature was raised to 80° C. When the total concentration of sodium, potassium, calcium and magnesium in the effluent had fallen below 10 mM, the input liquid was changed to water. When the effluent concentration of butylamine fell below 20 mN (or chloride level less than 10 mN) the vermiculite was emptied out into a bucket of hot deionised water, the amount of water being 10 to 15 times the weight of the vermiculite. The mixture was stirred and allowed to cool, ensuring that the vermiculite did not collect in stagnant areas of the bucket. Swelling of the vermiculite was observed when the temperature fell to 35° C. The stirring was continued until the temperature was below 30° C. and all the solid particles were dispersed and in suspension. After further cooling, the mixture was sieved using a 50 $\mu$m sieve and the small size fraction collected. The yield was 70%.

The vermiculite platelets present in the suspension were analysed using the aforementioned techniques and the results from measuring 73 platelets were as follows:

No of platelets having a particle size (a) less than 0.1 $\mu$m=0%, (b) in the range from 0.1 to 0.5 $\mu$m=23.3%, (c) in the range from 0.5 to 5.0 $\mu$m=71.2%, and (d) greater than 5.0 $\mu$m=5.5%.

Mean particle size=2.19 $\mu$m.

Mean platelet thickness=37.5A.

Mean aspect ratio=893.

A polyethylene terephthalate film was melt extruded, cast onto a cooled rotating drum and stretched in the direction of extrusion to approximately 3 times its original dimensions. The film was passed into a stenter oven, where the film was stretched in the sideways direction to approximately 3 times its original dimensions. The biaxially stretched film was heat set at a temperature of about 220° C. by conventional means. Final film thickness was 23 $\mu$m.

The biaxially oriented polyethylene terephthalate film was coated on one side using a No 4 Meyer Bar with a coating layer composition comprising the following ingredients:

| | |
|---|---|
| Vermiculite (5.5% aqueous dispersion) | 100 ml |
| Synperonic NP8 (nonyl phenol ethoxylate - supplied by ICI) | 5 ml |

The coated film was dried at 80° to 100° C. The thickness of the coating layer 0.7 μm.

The oxygen barrier property of the coated film was determined by measuring the oxygen permeability which was 4.5 cc/m²/day.

EXAMPLE 2

This is a comparative Example not according to the invention. The procedure in Example 1 was repeated except that the coating stage was omitted.

The uncoated biaxially oriented polyethylene terephthalate film was assessed for oxygen barrier property and found to have an oxygen permeability of 45 cc/m²/day.

EXAMPLE 3

The procedure in Example 1 was repeated except that the vermiculite suspension used in the coating layer formulation was prepared in accordance with the following method:

100 g of vermiculite ore (ex-Carolina, US) was refluxed with 1 liter of 1N lithium citrate solution at 80° C. for four hours and left at room temperature for five days. This resulted in the exchange of 45.3 mEq/100 g of lithium cations in the ore. The ion-exchanged vermiculite ore was washed 5 times with deionised water to remove the excess salts and left overnight to swell in a large volume (i.e. 10 times the volume of vermiculite) of deionised water. The swollen vermiculite was milled for 40 minutes in a Greaves high-shear mixer at 7200 rpm to produce a suspension of vermiculite platelets. The platelet suspension was then sieved by passing through a mechanically agitated filter having a pore size of 106 μm.

The vermiculite platelets present in a suspension made in accordance with the above method were analysed using the aforementioned techniques and the results were as follows:

No of platelets having a particle size-
(a) less than 0.1 μm=0%,
(b) in the range from 0.1 to 0.5 μm=12.5%,
(c) in the range from 0.5 to 5.0 μm=86.0%, and
(d) greater than 5.0 μm=1.5%.

Mean particle size=1.43 μm.
Mean platelet thickness=28.0 A.
Mean aspect ratio=962.

The biaxially oriented polyethylene terephthalate film, prepared as described in Example 1, was coated on one side using a No. 3 Meyer Bar with a coating layer composition comprising the following ingredients:

| | |
|---|---|
| Vermiculite (5% aqueous dispersion) | 100 ml |
| Synperonic NP8 (nonyl phenyl ethoxylate - supplied by ICI) | 5 ml |
| Fortirez (maleinised polybutadiene - supplied by ICI) | 0.25 g |

The coated film was dried at 80° to 100° C. The thickness of the coating layer 0.46 μm.

The oxygen barrier property of the coated film was determined by measuring the oxygen permeability which was 0.85 cc/m²/day.

EXAMPLE 4

This is a comparative Example not according to the invention. The procedure in Example 1 was repeated except that the vermiculite suspension used in the coating formulation was prepared as follows:

150 g of vermiculite ore (Mandoval micron grade, ex-South Africa) was agitated with saturated sodium chloride solution in 1:2 vermiculite:salt solution ratio by weight in a tank for 30 minutes at 80° C. The suspension was then centrifuged and washed with deionised water. The wet cake of vermiculite was transferred to a second tank where the vermiculite was stirred with 1.5N n-butylamine hydrochloride (1:2 solid:liquid ratio) for 30 minutes at 80° C. The resulting suspension was then centrifuged and washed with deionised water before transferring the wet cake to a swelling tank in which the vermiculite was stirred in deionised water. The suspension was passed through a stone-type mill which reduced approximately 50% of the particles to platelets of maximum dimension less than 50 μm. The milled suspension was classified in a weir-type centrifugal classifier and the lighter particles with sieve size less than 50 μm were collected.

The vermiculite platelets present in the suspension were analysed using the aforementioned techniques and the results were as follows:

No of platelets having a particle size-
(a) less than 0.1 μm=30%,
(b) in the range from 0.1 to 0.5 μm=60%,
(c) in the range from 0.5 to 5.0 μm=10%, and
(d) greater than 5.0 μm=less than 0.1%.

Mean particle size=0.3 μm.
Mean platelet thickness=30 A.
Mean aspect ratio=200.

The biaxially oriented polyethylene terephthalate film, prepared as described in Example 1, was coated on one side using a No 4 Meyer Bar with a coating layer composition comprising the following ingredients:

| | |
|---|---|
| Vermiculite (10% aqueous dispersion) | 100 ml |
| Synperonic NP8 (nonyl phenol ethoxylate - supplied by ICI) | 5 ml |

The coated film was dried at 80° to 100° C. The thickness of the coating layer 1.5 μm.

The oxygen barrier property of the coated film was determined by measuring the oxygen permeability which was 33.3 cc/m²/day.

EXAMPLE 5

A vermiculite suspension was prepared in a manner similar to that described in Example 3.

The biaxially oriented polyethylene terephthalate film, prepared as described in Example 1, was coated on one side using a reverse roll gravure coater having a backing roll with an acrylic primer layer coating composition. The primer layer was dried and coated using a reverse roll gravure coater having a backing roll, with a coating layer composition comprising the following ingredients:

| | |
|---|---|
| Vermiculite (8% aqueous dispersion) | 8 l |
| Acrylic resin (46% w/w aqueous latex of methyl methacrylate/ethyl acrylate/methacrylamide: 46/46/8 mole) | 1.3 l |
| Para toluene sulphonic acid | 100 ml |
| Synperonic N (27% w/w aqueous solution of a nonyl phenol ethoxylate, supplied by ICI) | 150 ml |
| Demineralised water | to 20 liters |

The coated film was dried at 180° C. The thickness of the coating layer was approximately 0.5 μm.

The oxygen barrier property was determined for the coated film by measuring the oxygen permeability which was 6.2 cc/m$^2$/day.

The above examples illustrate the improved properties of polymeric films of the present invention.

We claim:

1. A polymeric film comprising a substrate layer of polymeric material having on at least one surface thereof a coating layer comprising vermiculite platelets wherein 50 to 100% by number of the platelets have a particle size in the range of 0.5 to 5.0 μm and wherein from 60 to 100% of said vermiculite particles have an aspect ratio in the range from 500 to 1500.

2. A polymeric film according to claim 1 wherein 80 to 100% by number of the vermiculite platelets have a particle size in the range 0.1 to 5.0 μm.

3. A polymeric film according to claim 1 wherein 0 to 5% of the vermiculite platelets have a particle size less than 0.1 μm.

4. A polymeric film according to claim 1 wherein 0 to 10% of the vermiculite platelets have a particle size greater than 5.0 μm.

5. A polymeric film according to claim 1 wherein at least 70% by number of vermiculite platelets have a ratio of the maximum width to the minimum width of a platelet of less than 2:1.

6. A polymeric film according to claim 1 wherein at least 60% by number of vermiculite platelets have a thickness in the range from 25 to 40 A.

7. A polymeric film according to claim 1 wherein the substrate comprises a biaxially oriented film of polyethylene terephthalate.

8. A polymeric film according to claim 1 wherein the substrate comprises a biaxially oriented film of polypropylene.

9. A method of producing a polymeric film by forming a substrate layer of polymeric material, and applying to at least one surface thereof a coating layer comprising vermiculite platelets wherein 50 to 100% by number of the platelets have a particle size in the range 0.5 to 5.0 μm. and wherein from 60 to 100% of said vermiculite platelets have an aspect ratio in the range from 500 to 1500.

* * * * *